(12) United States Patent
Takahashi et al.

(10) Patent No.: US 6,801,852 B2
(45) Date of Patent: Oct. 5, 2004

(54) APPARATUS FOR AND METHOD OF CONTROLLING ELECTRONIC SYSTEM FOR MOVABLE BODY, ELECTRONIC SYSTEM FOR MOVABLE BODY, PROGRAM STORAGE DEVICE AND COMPUTER DATA SIGNAL EMBODIED IN CARRIER WAVE

(75) Inventors: Kazuyoshi Takahashi, Tsurugashima (JP); Toshio Tabata, Tsurugashima (JP); Motohiko Takayanagi, Tokyo-to (JP); Motoyuki Yamashita, Tokyo-to (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 10/164,601

(22) Filed: Jun. 10, 2002

(65) Prior Publication Data

US 2002/0188391 A1 Dec. 12, 2002

(30) Foreign Application Priority Data

Jun. 11, 2001 (JP) ........................................ 2001-175613

(51) Int. Cl.⁷ .............................. G06F 19/00; G06F 7/00
(52) U.S. Cl. .......................... 701/211; 701/36; 701/202; 701/207; 701/209; 340/988; 242/457
(58) Field of Search ................................. 701/202, 207, 701/209, 211, 36, 213, 200, 204, 205, 208, 210; 340/988, 990, 995; 342/457, 358

(56) References Cited

U.S. PATENT DOCUMENTS

| 5,765,123 | A | * | 6/1998 | Nimura et al. ............... 701/208 |
| 5,884,218 | A | * | 3/1999 | Nimura et al. ............... 701/208 |
| 5,908,465 | A | * | 6/1999 | Ito et al. ..................... 701/211 |
| 5,983,158 | A | * | 11/1999 | Suzuki et al. ............... 701/209 |
| 6,125,323 | A | * | 9/2000 | Nimura et al. ............... 701/207 |
| 6,516,269 | B2 | * | 2/2003 | Takeuchi ..................... 701/211 |
| 2002/0013815 | A1 | * | 1/2002 | Obradovich et al. ........ 709/204 |
| 2002/0055811 | A1 | * | 5/2002 | Obradovich .................. 701/23 |
| 2002/0142764 | A1 | * | 10/2002 | Newell et al. ............... 455/419 |
| 2002/0152264 | A1 | * | 10/2002 | Yamasaki ..................... 709/203 |

\* cited by examiner

Primary Examiner—Thomas G. Black
Assistant Examiner—Ronnie Mancho
(74) Attorney, Agent, or Firm—Sughrue Mion, PLLC

(57) ABSTRACT

An electronic system is provided with: an information outputting apparatus (20, 40, 50) having an output device (40, 50) for outputting a content information including at least one of an audio information and a video information; and a navigation apparatus (10, 18, 20, 40, 50, 60), which is equipped with an input device (60) for inputting a destination in a movement of a movable body. A controlling apparatus (20) for controlling the electronic system is provided with: a selecting device (20) for selecting the content information to be outputted during the movement of the movable body until an arrival at the destination, on the basis of the destination inputted by the input device; and an output controlling device (20) for controlling the output device so as to output the content information selected by the selecting device, during the movement of the movable body until the arrival at the destination.

20 Claims, 7 Drawing Sheets

APPARATUS FOR AND METHOD OF CONTROLLING ELECTRONIC SYSTEM FOR MOVABLE BODY, ELECTRONIC SYSTEM FOR MOVABLE BODY, PROGRAM STORAGE DEVICE AND COMPUTER DATA SIGNAL EMBODIED IN CARRIER WAVE

BACKGROUND OF THE INVENTION

1. Field of the Invention

The present invention relates to an apparatus for and a method of controlling an electronic system for a movable body, which includes an information outputting apparatus for a movable body installed within a car, such as a car audio system and the like, and a navigation apparatus for a movable body, such as an on-vehicle type. It also relates to an electronic system for a movable body, as well as a program storage device and a computer data signal embodiment in a carrier wave, which allow a computer to function as the above-mentioned controlling apparatus.

2. Description of the Related Art

An on-vehicle information outputting apparatus, such as a car audio system, a car stereo, a car television and the like, is designed so as to reproduce a signal from a CD (Compact Disc), a DVD, an MD (Mini Disc), a cassette tape or the like, and perform an audio-output and/or a video-output inside the car by using a speaker, a display device and the like which are installed within the car. Or, it is designed so as to receive an electric wave for a radio and a television, and demodulate it, and then perform an audio-output and/or a video-output inside the car.

On the other hand, the on-vehicle navigation apparatus is designed so as to display map data, current position data, various guide data and the like on a display device, and/or output a voice of a guide message, an alarm message or the like for the navigation by using a speaker installed within the car.

The information outputting apparatus and the navigation apparatus, which are intended to be installed within the same car, are typically designed so as to share the display device, the speaker and the like.

However, the information output device and the navigation device, which are installed within the car, have only the functions independently of each other. Thus, input data for navigation (for example, destination data) and output data (for example, a necessary time length until the arrival at the destination, a route and the like) cannot be reflected in an audio output and a video output in the information output device. It is troublesome and difficult for a driver or a fellow passenger, who inputs the destination as a peculiarly geographical name, for example, such as "KUJUKURIHAMA (KUJUKURI-beach)", "SHONANKAIGAN" (SHONAN-coast), "YATSUGATAKE (YATSU-mountains)" or the like, to investigate and determine what is an audio information (for example, a music composition related to "Sea") or a video information (for example, a music composition related to "Sea") appropriate for this destination, and it is further troublesome and difficult for the driver or the fellow passenger, who has already ridden in the car, to set or operate the information output device so as to output the determined audio information (for example, a music album, a set of music compositions of the same artist, a radio program and the like) and/or the determined video information (for example, a movie, an electronic book, a television program and the like). Hence, the artificial work itself, such as the selection of the audio information and the video information appropriate for the traveling state of the self-car traveling towards the destination as mentioned above is rarely actually carried out.

As mentioned above, there is a problem that if the various electronic apparatuses in the recent years are commonly used, or even if the navigation apparatus and the information outputting apparatus for the movable body which are established within the electronic system for the same movable body are used, the audio information and/or the video information appropriate for the traveling state of the self-car cannot be outputted.

SUMMARY OF THE INVENTION

The present invention is proposed in view of the above mentioned problems. It is therefore an object of the present invention to provide an apparatus for and a method of controlling an electronic system for a movable body, which can control the electronic system for the movable body which includes an information outputting apparatus for the movable body and a navigation apparatus for the movable body so that audio information and/or the video information appropriate for the traveling state of the movable body can be outputted, and an electronic system for a movable body having such a controlling apparatus, as well as a program storage device and a computer data signal embodiment in a carrier wave, which allow a computer to function as the controlling apparatus.

The above object of the present invention can be achieved by a controlling apparatus for controlling an electronic system for a movable body, the electronic system provided with: an information outputting apparatus having an output device which outputs a content information including at least one of an audio information and a video information; and a navigation apparatus, which is equipped with an input device through which a destination in a movement of a movable body can be inputted and which carries out a navigation operation with regard to the destination inputted by the input device, the controlling apparatus provided with: a selecting device which selects the content information to be outputted during the movement of the movable body until an arrival at the destination, on the basis of the destination inputted by the input device; and an output controlling device which controls the output device so as to output the content information selected by the selecting device, during the movement of the movable body until the arrival at the destination.

According to the controlling apparatus, in the electronic system for the movable body, the content information including the video information is displayed on a picture plane of a display device, which is equipped in the information outputting apparatus such as a car audio system, a car stereo system, a car TV system, a portable TV system or the like. Alternatively, the content information including the audio information is sound-outputted from a speaker mounted on the car, a headphone of the portable audio system or the like. At this time, as the video information, there are movies, dramas, animations or the like, which are reproduced from a record medium such as a CD, a DVD, a hard disc etc., or which are radio-wave-received and demodulated, as well as the text information etc., which are image-formed to be displayed. As the audio information, there are the music compositions, which are reproduced from a record medium such as a CD, a DVD, a hard disc etc., or which are radio-wave-received and demodulated, as well as the audio information accompanying the video information, the text information which are made into the sound or the like. Incidentally, in the present invention, the information which can be outputted in an arbitrary form to the driver or the fellow passenger or the moving person by the information outputting apparatus, including those video information and audio information, is called as the "content information". Also in the present invention, the "movable body" has a broad meaning, which means not only a car, an auto mobile or a vehicle, a ship, an airplane or the like, on which the information outputting apparatus and the navigation apparatus for the movable body are mounted, but also a human being which walks and carries the electronic system for the movable body or the information outputting apparatus and the navigation apparatus for the movable body.

On the other hand, in the electronic system for the movable body, the navigation apparatus measures the current position by the GPS (Global Positioning System) measurement and/or the self-sustained or dead-reckoning positioning measurement. Then, it may calculate an optimum route to a destination from the current position to thereby display the optimum route. It may calculate a necessary time length to arrive at a destination. It may display the map information at the vicinity of the current position on the display device, and may superimpose a current position mark on the displayed map information. As described above, the navigation apparatus performs navigation operations. The navigation apparatus of the present invention is at least provided with an input device through which the destination in the movement of the movable body can be inputted, such as a key, a mouse, a touch panel, a voice-inputting device or the like.

Especially, by the selecting device, the content information corresponding to the destination inputted by the input device is selected from among the content information, which has been stored in the memory or the like in advance or has been downloaded through the communication device from a database, or as the content information to be downloaded through the communication device from a database, for outputting. For example, when a destination is inputted as a peculiarly geographical name, for example, such as "KUJUKURIHAMA (KUJUKURI-beach)", "SHONAN-KAIGAN (SHONAN-coast)", "YATSUGATAKE (YATSUGA-mountain)", "YOKOHAMA (YOKOHAMA-city)", "CHIBA (CHIBA-city or prefecture)", "NAGANO (NAGANO-prefecture)", and the like, or as an abstractly geographic name, such as "Sea", "Seaside", "Port", "Mountain" and the like, a music album and a set of music compositions of the same artist related to the "SEA", for example, is selected, or a movie, a comic, or the like related to the "SEA" is selected as the content information corresponding to the destination. Moreover, it is possible to select such content information corresponding to the geographic name from among the video pictures and/or music compositions belonging to the favorite artists or genres preset in accordance with the tastes of a driver, a fellow passenger, a moving person and the like. It is also possible to prepare a music composition list or a play list, which is composed of a plurality of music compositions and which indicates a combination of a plurality of content information depending on the inputted destination. Furthermore, it is possible to select a story or the like recorded on a tape, an electronic book, and the like corresponding to the destination. It is also possible to select a television program and/or a radio program corresponding to the destination. Then, the output device outputs the content information selected by the selecting device under the control of the output controlling device during the movement of the movable body until the arrival at the destination. Therefore, the content information corresponding to the destination inputted at the navigation apparatus is outputted during the movement.

In this manner, it is possible to perform the audio output and/or the video output appropriate for the movement state of the movable body, in the electronic system for the movable body, which includes the information outputting apparatus and the navigation apparatus.

In one aspect of the controlling apparatus of the present invention, the selecting device selects one or a plurality of content information related to the inputted destination, by retrieving a database, which correlates a preset geographical name with the one or plurality of content information, by using the inputted destination as a keyword.

According to this aspect, the database correlating the geographical name with the one or plurality of content information is constructed in a memory device contained in the electronic system for the movable body or constructed in a server device accessible through a communication device, for example. When the destination is inputted by the input device, the selecting device selects the one or plurality of content information related to the destination by retrieving the database, by using the destination as the keyword. Therefore, by using one database, it is possible to select the content information corresponding to the destination relatively easily and speedily, and thereby possible to perform the audio output and/or the video output appropriate for the movement state of the movable body.

In this aspect, the selecting device may select the content information on the basis of a relational degree on the plurality of content information related to at least one geographical name.

By constituting in this manner, when inputting one destination, in case that a plurality of content information are correlated with this destination on the database, it is possible to restrict the selected number of content information within a suitable number on the basis of the relational degree. Thus, it is possible to perform the audio output and/or the video output appropriate for the movement state of the movable body.

Incidentally, information indicating such a relational degree may be stored in the database, together with the content information or separately from the content information, in correlation with each of the content information. Alternatively, a selection condition at the selecting device (e.g., an order of retrieving) may be correlated with the relational degree, or information indicating such a relational degree may be generated on the basis of the selection condition. Further, this generated information may be stored in the database.

In another aspect of the controlling apparatus of the present invention, the selecting device determines an output order of the plurality of content information to be outputted at the output device in case of selecting the plurality of content information, and the output controlling device controls the output device so as to output the plurality of content information in the output order determined by the selecting device.

According to this aspect, in case of selecting the plurality of content information, the selecting device not only selects them, but also determines the output order of them at the output device. For example, a music composition list or a play list including the output order is constructed. Then, the output device outputs the plurality of content information in accordance with thus determined music composition list or the like, so that it is possible to perform the audio output and/or the video output appropriate for the movement condition of the movable body.

In this aspect in which the output order is also determined, the selecting device may determine the output order on the basis of a relational degree on the plurality of content information related to at least one geographical name.

By constituting in this manner, when inputting one destination, in case that a plurality of content information are correlated with this inputted one destination on the database, the output order of them is determined on the basis of the relational degree. Accordingly, it is possible to perform the audio output and/or the video output appropriate for the movement condition of the movable body.

Incidentally, information indicating such a relational degree may be stored in the database, together with the content information or separately from the content information, in correlation with each of the content information. Alternatively, a selection condition at the selecting device (e.g., an order of retrieving) may be correlated with the relational degree, or information indicating such a relational degree may be generated on the basis of the selection condition. Further, this generated information may be stored in the database.

In this aspect in which the output order is also determined, the selecting device may determine the output order such that the content information having a higher relational degree to the destination among the plurality of content information is outputted in vicinity of the destination.

By constituting in this manner, the content information, which has a higher relational degree to the destination, is outputted as the movable body approaches the destination. Thus, it is possible to perform the audio output and/or the video output appropriate for the movement condition of the movable body.

In another aspect of the controlling apparatus of the present invention, the selecting device selects one or a plurality of relational keywords related to the inputted destination by retrieving a first database, which correlates a preset geographical name with the one or plurality of relational keywords, by using the inputted destination as a keyword, and selects the one or plurality of content information related to the selected relational keyword or keywords by retrieving a second database, which correlates a preset relational keyword with the one or plurality of content information, by using the selected relational keyword or keywords as a keyword.

According to this aspect, the first database, which correlates the geographical name with the one or plurality of relational keywords, is constructed in a memory device contained in the electronic system for the movable body or constructed in a server device accessible through a communication device, for example. When the destination is inputted by the input device, the selecting device selects the one or plurality of relational keywords related to the destination, by retrieving the first database by using the destination as the keyword. The relational keywords may be an abstractly geographic name such as "Sea", "Coast", "Bay", "Mountain", "Hot Spring", "Temple", or the like, or may be an abstract name such as "Ski", "Camp", "Movie", "Ship", "Wedding Ceremony" or the like. Further, the second database, which correlates the relational keyword with one or a plurality of content information, is constructed in a memory device contained in the electronic system for the movable body or constructed in a server device accessible through a communication device, for example. Then, after the relational keyword is selected from the first database, the selecting device retrieves the second database by using this selected relational keyword as the keyword this time, so as to select one or a plurality of content information related with the relational keyword. Therefore, by using two databases, it is possible to select the content information corresponding to the destination relatively easily and speedily, and thus, it is possible to perform the audio output and/or the video output appropriate for the movement condition of the movable body.

In this aspect related to the first and second databases, the selecting device may select the relational keyword or keywords on the basis of a relational degree on the plurality of relational keywords related to at least one geographical name.

By constituting in this manner, when inputting one destination, in case that a plurality of content information are correlated with this destination on the first database, it is possible to restrict the selected number of content information within a suitable number on the basis of the relational degree.

Incidentally, information indicating such a relational degree may be stored in the first database, together with the content information or separately from the content information, in correlation with each of the content information. Alternatively, a selection condition at the selecting device (e.g., an order of retrieving) may be correlated with the relational degree, or information indicating such a relational degree may be generated on the basis of the selection condition. Further, this generated information may be stored in the first database.

In this aspect related to the first and second databases, the selecting device may select the content information on the basis of a relational degree on the plurality of content information related to at least one relational keyword.

By constituting in this manner, after selecting the relational keyword on the first database, in case that the plurality of content information are correlated with this relational keyword on the second database, it is possible to restrict the selected number of content information within a suitable number on the basis of the relational degree.

Incidentally, information indicating such a relational degree may be stored in the second database, together with the content information or separately from the content information, in correlation with each of the content information. Alternatively, a selection condition at the selecting device (e.g., an order of retrieving) may be correlated with the relational degree, or information indicating such a relational degree may be generated on the basis of the selection condition. Further, this generated information may be stored in the second database.

In this aspect related to the first and second databases, the selecting device determines an output order of the content information to be outputted at the output device in case of selecting the plurality of content information, and the output controlling device controls the output device so as to output the plurality of content information in the output order determined by the selecting device.

By constituting in this manner, in case of selecting the plurality of content information, the selecting device not only selects them, but also determines the output order of them at the output device. For example, a music composition list or a play list including the output order is constructed. Then, the output device outputs the plurality of content information in accordance with this determined music composition list or the like, so that it is possible to perform the audio output and/or the video output appropriate for the movement condition of the movable body.

In this aspect in which the output order is also determined, the selecting device may determine the output order on the basis of a relational degree on a plurality of relational keywords related to at least one geographical name.

By constituting in this manner, when inputting one destination, in case that a plurality of content information are correlated with this inputted one destination on the first database, the output order of the content information further correlated with the relational keyword is determined on the basis of the relational degree. Accordingly, it is possible to perform the audio output and/or the video output appropriate for the movement condition of the movable body.

Incidentally, information indicating such a relational degree may be stored in the first database, together with the content information or separately from the content information, in correlation with each of the content information. Alternatively, a selection condition at the selecting device (e.g., an order of retrieving) may be correlated with the relational degree, or information indicating such a relational degree may be generated on the basis of the selection condition. Further, this generated information may be stored in the first database.

In this aspect in which the output order is also determined, the selecting device determines the output order on the basis of a relational degree on the plurality of content information related to at least one relational keyword.

By constituting in this manner, in case that the plurality of content information are correlated with the relational keyword selected on the first database, the output order of the content information is determined on the basis of the relational degree. Accordingly, it is possible to perform the audio output and/or the video output appropriate for the movement condition of the movable body.

Incidentally, information indicating such a relational degree may be stored in the second database, together with the content information or separately from the content information, in correlation with each of the content information. Alternatively, a selection condition at the selecting device (e.g., an order of retrieving) may be correlated with the relational degree, or information indicating such a relational degree may be generated on the basis of the selection condition. Further, this generated information may be stored in the second database.

In this aspect in which the output order is also determined, the selecting device determines the output order such that the content information having a higher relational degree to the destination among the plurality of content information is outputted in vicinity of the destination.

By constituting in this manner, the content information, which has a higher relational degree to the destination, is outputted as the movable body approaches the destination. Thus, it is possible to perform the audio output and/or the video output appropriate for the movement condition of the movable body.

In this aspect related to the first and second databases, after selecting one relational keyword, the selecting device further selects one or a plurality of different relational keywords related to the one selected relational keyword, by retrieving the first database by using the one selected relational keyword as a keyword.

By constituting in this manner, one relational keyword related to the destination is selected as the selecting device retrieves the first database. Further after that, by retrieving the first database by using this selected one relational keyword as the keyword, one or a plurality of different relational keywords related with this selected one relational keyword are further selected. Namely, so to speak "indirectly related" relational keyword or keywords are selected, via one relational keyword, not directly related with the destination. Therefore, if the relational keyword or keywords in a certain amount and further the content information related to those keywords with respect to one destination cannot be selected, it is possible to avoid the shortage in the content information related to the destination, by including the content information related to the relational keyword indirectly related in this manner into the selection object. Incidentally, it is not always necessary to retrieve the first database by using the once selected relational keyword or keywords if the relational keyword or keywords in a certain amount and further the content information related to those keywords with respect to one destination can be selected. On the contrary, even after further retrieving the first database by using the relational keyword as the keyword, if the relational keyword or keywords in a certain amount and further the content information related to those keywords with respect to one destination cannot be selected, it is possible to repeat retrieving the first database, by using the retrieved relational keyword or keywords as the keyword. In addition, in case of repeatedly performing the retrieval in this manner by using the relational keyword or keywords as the keyword, it is possible to utilize the information indicating at which times it is retrieved as the aforementioned information indicting the relational degree.

In another aspect of the controlling apparatus of the present invention, the navigation apparatus is further provided with a calculating device which calculates a necessary time length required for the movable body to arrive at the destination inputted by the input device from a current position of the movable body, and the selecting device selects the content information in accordance with the calculated necessary time length in addition to the destination.

According to this aspect, when the destination is inputted by the input device, the calculating device calculates the necessary time length required for the movable body to arrive at the destination. Then, the selecting device selects the content information in accordance with the calculated necessary time length in addition to the destination. For example, if the destination is "KUJUKURIHAMA (KUJUKURI-beach)" and if the necessary time length is 2 hours, the music composition list or the like comprising a plurality of content information related to "ocean" or "sea" for 2 hours is prepared.

In this aspect, the navigation apparatus may be further provided with a monitoring device which monitors whether or not the movement of the movable body is on schedule, and the selecting device may apply a change onto the content information to be outputted after a current time point if the movement of the movable body is not on schedule according to a monitor result of the monitoring device.

By constituting in this manner, the monitoring device monitors whether or not the movement of the movable body is on schedule. Then, if the movement of the movable body is not on schedule according to a monitor result of the monitoring device, the selecting device applies a change onto the content information to be outputted after a current time point. For example, if the destination is "KUJUKURI-HAMA (KUJUKURI-beach)" and the movement of the movable body is behind the schedule, one or a plurality of content information related to the "ocean" or "sea" may be added onto the music composition list or the like. Alternatively, if the destination is "KUJUKURIHAMA (KUJUKURI-beach)" and the movement of the movable body is ahead of the schedule, one or a plurality of content information related to the "ocean" or "sea" may be deleted on the music composition list or the like. Especially as mentioned before, in case that the selecting device determines the output order such that the content information having a higher relational degree to the destination among the plurality of content information is outputted in vicinity of the destination, even if a certain deviation occurs in the necessary time length, it is still possible to maintain such a plan that the content information having the higher relational degree to the destination is outputted in vicinity of the destination, by performing the addition or deletion on the music composition list in this manner.

The above object of the present invention can be achieved by a program storage device readable by a computer for tangibly embodying a program of instructions executable by the computer to perform method processes in the above described electronic system for the movable body of the present invention, the method processes provided with: a selecting process of selecting the content information to be outputted during the movement of the movable body until an arrival at the destination, on the basis of the destination inputted by the input device; and an output controlling process of controlling the output device so as to output the content information selected by the selecting process, during the movement of the movable body until the arrival at the destination.

According to the program storage device, the above described controlling apparatus for controlling the electronic system of the present invention can be relatively easily realized as a computer reads and executes the program of instructions from the program storage device such as a CD-ROM (Compact Disc—Read Only Memory), a DVD-ROM (DVD Read Only Memory), a hard disc or the like, or as it executes the program of instructions after downloading the program through communication device. Moreover, the program of instructions can be sent from a server device together with an application program required for the navigation or the audio and/or video outputting, or other data such as map data, audio information data, video information data and so on.

The above object of the present invention can be also achieved by a computer data signal embodied in a carrier wave and representing a series of instructions which cause a computer to perform method processes in the above described electronic system for the movable body of the present invention, the method processes provided with: a selecting process of selecting the content information to be outputted during the movement of the movable body until an arrival at the destination, on the basis of the destination inputted by the input device; and an output controlling process of controlling the output device so as to output the content information selected by the selecting process, during the movement of the movable body until the arrival at the destination.

According to the computer data signal embodied in the carrier wave of the present invention, as the computer downloads the program in the computer data signal through a computer network or the like, and executes this program, it is possible to realize the above described controlling apparatus for controlling the electronic system of the present invention.

The above object of the present invention can be achieved by the above described electronic system for the movable body of the present invention provided with the above described controlling apparatus of the present invention (including its various aspect).

According to the electronic system for the movable body of the present invention, since it is provided with the controlling apparatus of the present invention, it is possible to perform the audio output and/or the video output appropriate for the movement state of the movable body.

The above object of the present invention can be also achieved by a controlling method of controlling the above described electronic system for the movable body of the present invention, the controlling method provided with: a selecting process of selecting the content information to be outputted during the movement of the movable body until an arrival at the destination, on the basis of the destination inputted by the input device; and an output controlling process of controlling the output device so as to output the content information selected by the selecting process, during the movement of the movable body until the arrival at the destination.

According to the controlling method for controlling the electronic system of the present invention, in the same manner as in the above described controlling apparatus of the present invention, in the electronic system provided with the information outputting apparatus and the navigation apparatus, it is possible to perform the audio output and/or the video output appropriate for the movement state of the movable body.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Preferred embodiments of the present invention will be explained below with reference to the drawings. The respective embodiments as described below are designed such that an electronic system for a movable body according to the present invention is established as an on-vehicle electronic system.

(First Embodiment)

At first, an on-vehicle electronic system according to a first embodiment is described with reference to FIG. 1 to FIG. 3.

Figure 1:
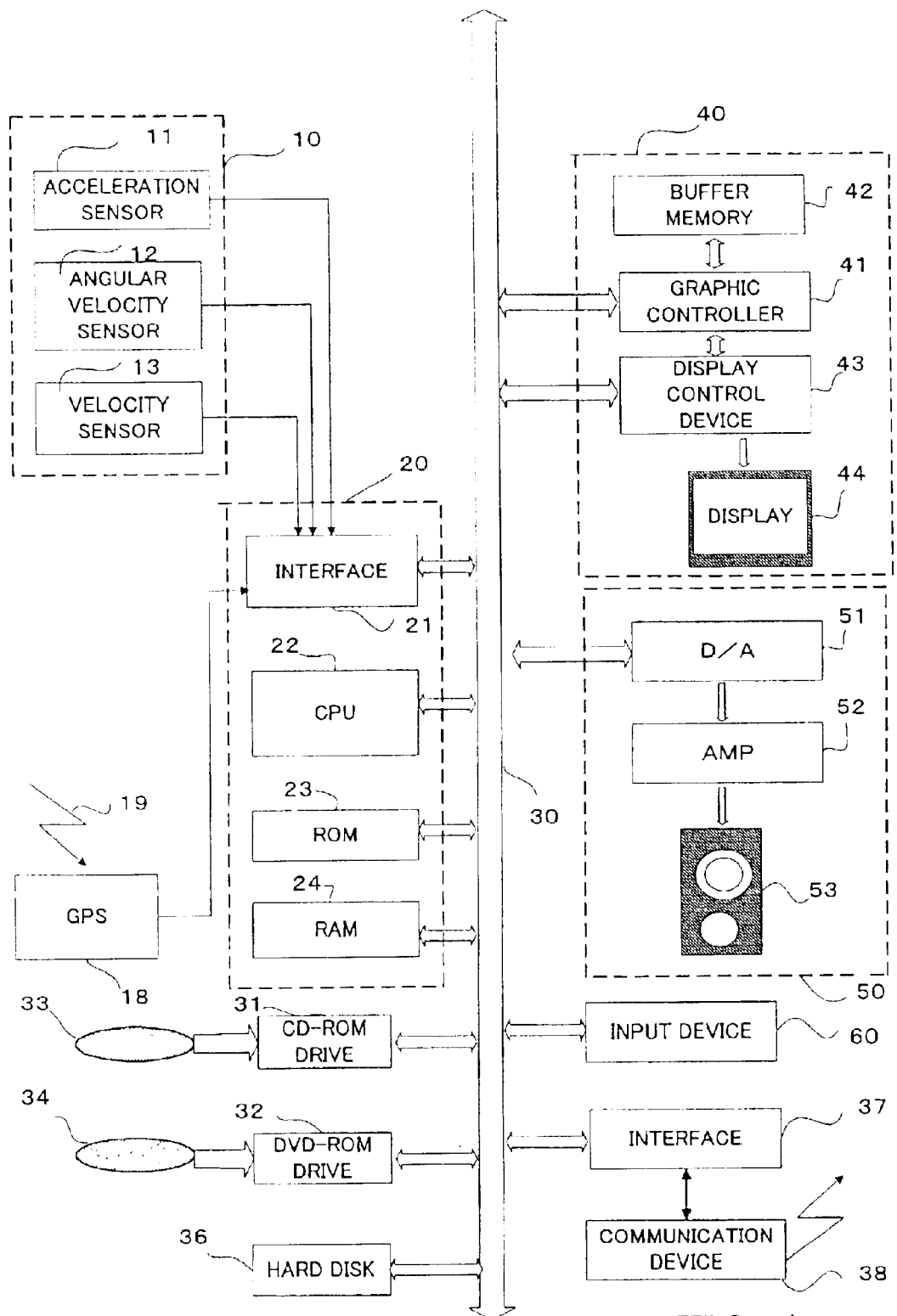
FIG. 1 is a block diagram showing a configuration of an on-vehicle electronic system of a first embodiment of the present invention.

As shown in FIG. 1, the on-vehicle electronic system in this embodiment is provided with a self-sustained positioning device 10 (i.e., a dead-reckoning or built-in positioning device), a GPS (Global Positioning System) receiver 18, a system controller 20, a CD-ROM drive 31, a DVD-ROM drive 32, a hard disc device 36, a communication interface 37, a communication device 38, a display device 40, an audio output device 50 and an input device 60.

The self-sustained positioning device 10 is composed of an acceleration sensor 11, an angular velocity sensor 12 and a velocity sensor 13. The acceleration sensor 11 is composed of, for example, a piezoelectric element, and it detects an acceleration of a car, and then outputs an acceleration data. The angular velocity sensor 12 is composed of, for example, a vibration gyroscope, and it detects an angular velocity of a car when a direction of the car is changed, and then outputs an angular velocity data and a relative azimuth data.

The velocity sensor 13 is composed of a car velocity sensor for detecting a rotation of a shaft of the car mechanically, magnetically or optically, and then generating a car speed pulse, which is a pulse signal, for each rotation of a predetermined angle in the shaft.

The GPS receiver 18 is a device for receiving electric waves 19 to send down link data including positioning data from a plurality of GPS satellites to be used to detect an absolute position of the self-car on the basis of latitude and longitude information and the like.

The system controller 20 includes an interface 21, a CPU (Central Processing Unit) 22, a ROM (Read Only Memory) 23 and a RAM (Random Access Memory) 24, and it is configured so as to control the on-vehicle electronic system as a whole.

The interface 21 carries out the interface operations between the acceleration sensor 11, the angular velocity sensor 12 and the velocity sensor 13 and the GPS receiver 18. From them, the interface 21 inputs the car speed pulse, the acceleration data, the relative azimuth data, the angular velocity data, the GPS positioning data, the absolute azimuth data and the like to the system controller 20. The CPU 22 controls the system controller 20 as a whole. The ROM 23 has a non-volatile memory (not shown) for storing therein a control program to control the system controller 20 and the like. The RAM 24 stores various data, such as a route data and the like, at a readable condition, which are preset by a user through the input device 60, and provides a working area to the CPU 22.

The system controller 20, the CD-ROM drive 31, the DVD-ROM drive 32, the hard disc device 36, the communication interface 37, the display device 40, the audio output device 50 and the input device 60 are connected through a bus line 30 to each other.

The CD-ROM drive 31 and the DVD-ROM drive 32 read out the various data, such as a road data including a car lane number, a road width and the like, and the control programs corresponding to the later-described respective embodiments, respectively, from a CD 33 and a DVD 34, and output them, under the control of the system controller 20.

Moreover, the CD-ROM drive 31 and the DVD-ROM drive 32 read out the audio data and the video data constituting an example of content information, respectively, from the CD 33 and the DVD 34, under the control of the system controller 20.

By the way, as for the CD-ROM drive 31 and the DVD-ROM drive 32, it is allowable to install only one of them or a drive compatible with the CD and the DVD.

The hard disc device 36 stores therein the audio data and the video data read out from the CD-ROM drive 31 or the DVD-ROM drive 32, and the navigation data including a map data and the like. Thus, for example, while reading out the map data on the CD-ROM 33 or the DVD-ROM 34 and carrying out the navigation operation, the user can read out the audio data and/or the video data stored in the hard disc device 36 and can perform the audio output and/or the video output. Or, while reading out the audio data and/or the video data on the CD-ROM 33 and the DVD-ROM 34 and outputting the voice and/or the picture, the user can read out the map data stored in the hard disc device 36 and carry out the navigation operation. Moreover, the audio data, the video data, the map data or the like downloaded by the communication device 38 can be stored into the hard disc device 36. Then, it can be read out and outputted at any future time.

The communication device 38 is composed of, for example, a portable telephone, and it is designed so as to download the audio data, the video data, the map data and the like, or all of predetermined kinds of database with regard to them or a part thereof, through the communication interface 37 constituting a modem and the like.

The display device 40 displays various display data under the control of the system controller 20. The display device 40 is provided with: a graphic controller 41 for performing the entire control on the display device 40 in accordance with a control data sent from the CPU 22 through the bus line 30; a buffer memory 42, which is composed of memories such as VRAM (Video RAM) and the like, for transiently storing an instantly displayable video information; a display controller 43 for performing the display control on a display 44, such as a small LCD (Liquid Crystal Display), an EL (Electro-Luminescence) display, a CRT (Cathode Ray Tube) or the like, in accordance with the video data outputted by the graphic controller 41; and the display 44. The display 44 is a liquid crystal display in which a length of a diagonal line is, for example, about 5 to 10 inches, and it is fixed in the vicinity of a front panel within the car.

The audio output device 50 is composed of: a D/A (Digital to Analog) converter 51 for performing a D/A conversion on an audio digital data sent through the bus line 30 from the CD-ROM drive 31 or the DVD-ROM drive 32 or the RAM 24 or the like, under the control of the system controller 20; an amplifier (AMP) 52 for amplifying an audio analog signal outputted by the D/A converter 51; and a speaker 53 for converting the amplified audio analog signal into a voice and outputting it inside the car The input device 60 is composed of keys, switches, buttons, a remote controller, a voice input device and the like. The input device 60 is mounted around the display 44 and the front panel of the body in the on-vehicle electronic system installed within the car.

As mentioned above, in the on-vehicle electronic system in this embodiment, the navigation system is established which is provided with the self-sustained positioning device 10, the GPS receiver 18, the system controller 20, the CD-ROM drive 31, the DVD-ROM drive 32, the hard disc device 36, the communication interface 37, the communication device 38, the display device 40, the audio output device 50, the input device 60 and the like, and the car audio system is also established which is provided with the system controller 20, the CD-ROM drive 31, the DVD-ROM drive 32, the hard disc device 36, the communication interface 37, the communication device 38, the display device 40, the audio output device 50, the input device 60 and the like. That is, a plurality of constitutional elements are shared by the navigation system and the car audio system. As the entire on-vehicle electronic system, the total control is performed by the system controller 20.

In addition, in the on-vehicle electronic system in this embodiment, a music composition database 100 is especially established within the hard disc device 36.

Figure 2A:
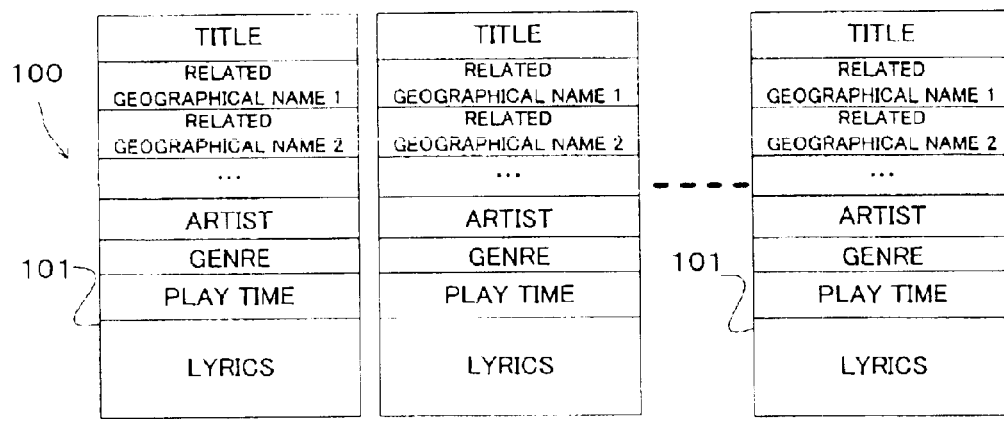
FIG. 2A is one conceptual view showing one data configuration in a music composition database used in the first embodiment.
Figure 2B:
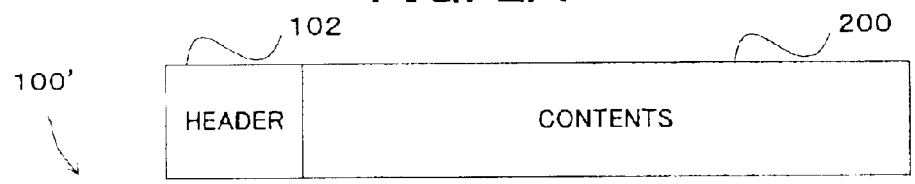
FIG. 2B is another conceptual view showing another data configuration in the music composition database used in the first embodiment.
Figure 2B:
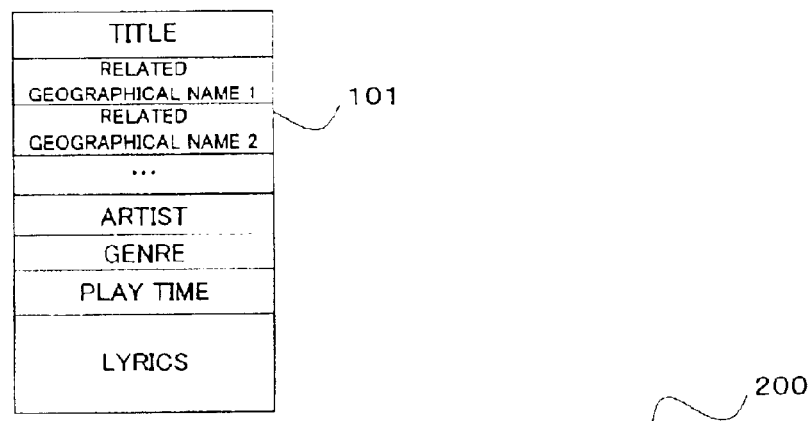
Figure 2B:
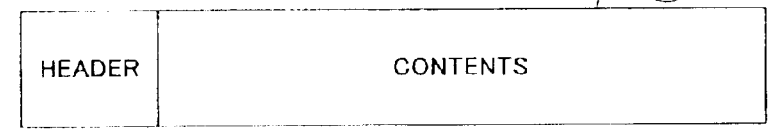
Figure 2B:
Figure 2B:
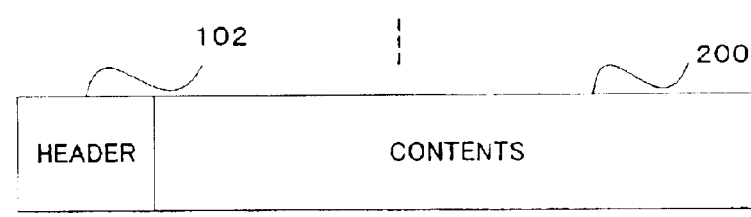

For example, as shown in FIG. 2A, a music composition database 100 is constructed by a plurality of attribute information files 101, such as a related geographical name #1, a related geographical name #2, . . . , a play time length, a genre, a playing artist, lyrics and the like, are stored in correlation with a title of each music composition, under the condition separated from a content information containing an audio information to play a music composition. Such a music composition database 100 can be obtained, for example, on the Internet. Or, as shown in FIG. 2B, a music composition database 100' may be constructed by a plurality of content information 200, by storing such an attribute information file 101 in a header 102 of the content information 200 having a corresponding audio information. By the way, the related geographical names #1, #2, . . . are preset as the geographical names deeply related to the music composition. Then, they may additionally have the information indicative of the relational degree, or they may be defined such that the order of the related geographical names #1, #2, . . . correspond to the order of the relational degree.

However, in place of or in addition to the establishment of the music composition database 100 or 100' in the hard disc device 36, it may be designed so as to access a music composition database established in a server and the like located at a remote position through the communication device 38, by using the system controller 20.

By the way, the on-vehicle electronic system can be naturally provided with various constitutional elements constituting a known car audio system and/or car television system, such as a radio antenna, a radio tuner, a television antenna, a television tuner, a cassette deck, an MD drive and the like, in addition to the constitutional elements shown in FIG. 1.

The data processes in the first embodiment and the later-described respective embodiments are mainly executed by a CPU 22 shown in FIG. 1. Actually, a computer program for controlling a navigation system, a computer program for controlling a car audio system and a computer program for controlling a database are mainly executed by the CPU 22. Then, the agent having a function of automatically making a music composition list or a play list appropriate for a destination within the on-vehicle electronic system is also logically established within the CPU 22 by the computer program. Also, such computer programs may be stored in a ROM 23, a CD-ROM 33 or a DVD-ROM 34. Or, they may be downloaded through a communication device 38 of a portable telephone or the like to a RAM 42, a hard disc device 36 and the like.

A series of processes for automatically making the music composition list appropriate for the destination and then reproducing the music compositions in accordance with it in the on-vehicle electronic system of the first embodiment having the above-mentioned configuration will be described below with reference to a flowchart in FIG. 3.

Figure 3:
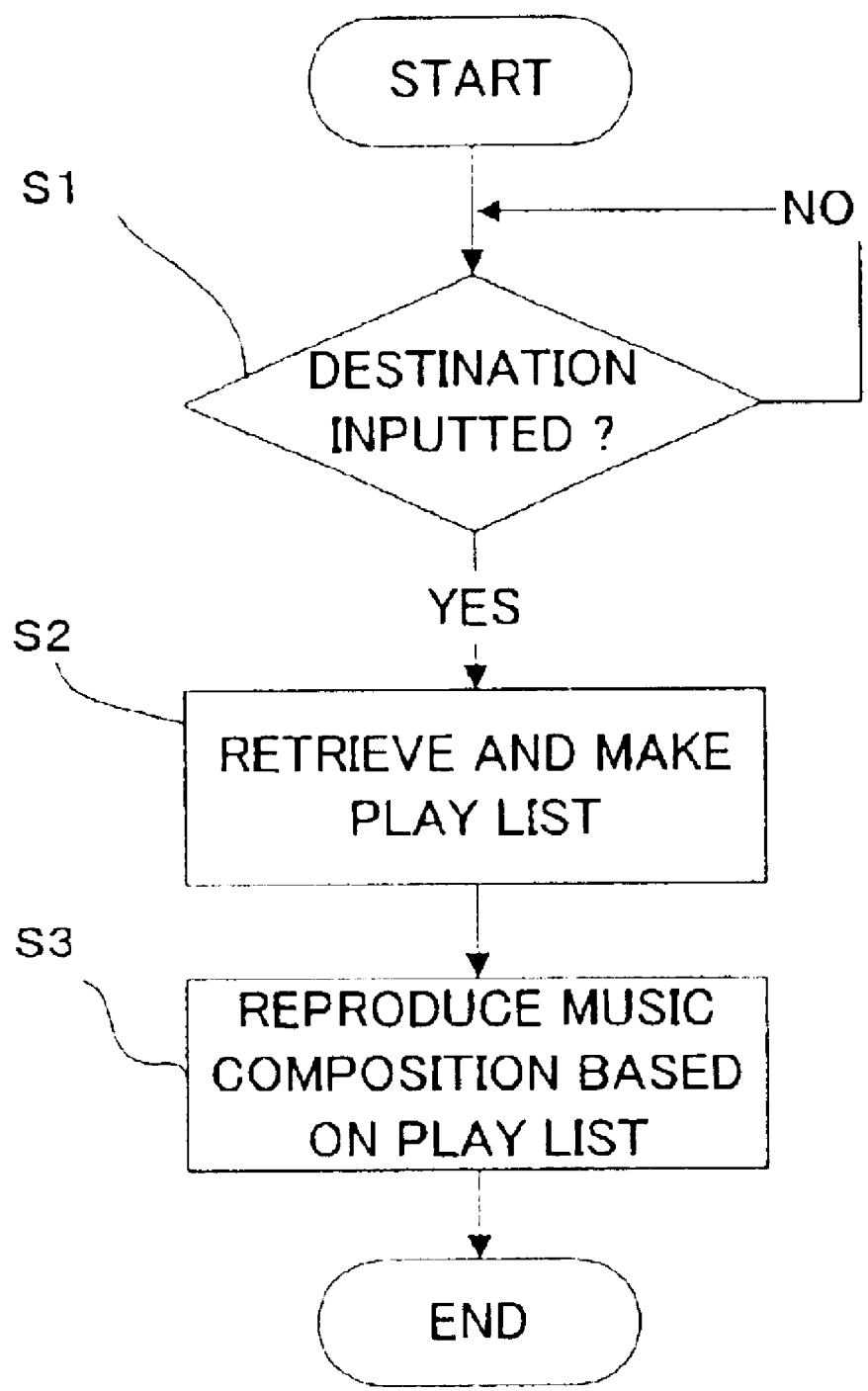
FIG. 3 is a flowchart showing operations in the first embodiment.

In FIG. 3, if the mode of automatically making the play list appropriate for the destination is set by a mode switching operation through the input device 60 and the like, it is checked whether or not the destination is inputted through the input device 60, as one of input operations on the navigation system (Step S1). This input is carried out by using a key input, a selective input through a button on a screen, a voice input and the like. For example, "KUJUKU-RIHAMA (KUJUKURI-beach)" is inputted as the destination. Also, the input of the destination at the step S1 may include an abstractly geographic name, such as "Sea", "Seaside", "Port", "Mountain" and the like.

If the input of the destination is detected (Step S1: Yes), the agent for automatically making the play list, which is established within the CPU 22, retrieves the music composition database 100, for example, as shown in FIG. 2A or FIG. 2B, by using the inputted destination as a retrieval keyword. At this time, the related geographical name #1, the related geographical name #2, . . . in the attribute information file 101 may be targeted for the retrieval, or instead of them, a text data constituting the words of the music composition may be targeted for the retrieval. Then, this retrieval is performed until the retrieval of the title corresponding to the content information having the amount enough to output in a necessary time length (for example, two hours) until the arrival at the destination, which is separately calculated by the navigation system, or until the completion of the retrieval of the entire music composition database. Accordingly, the music composition list or the play list composed of a plurality of retrieved music compositions is made (Step S2). By the way, the retrieval at the step S2 may be performed by narrowing down the retrieval target to the music compositions belonging to the favorite artists or genres preset in accordance with the tastes of a driver, a fellow passenger, a moving person and the like.

Next, the car audio system sequentially reproduces the music compositions in accordance with the thus-made play list (Step S3).

As mentioned above, according to the on-vehicle electronic system of the first embodiment, the music compositions are reproduced correspondingly to the traveling state of the self-car traveling towards the destination.

In the first embodiment as mentioned above, at the time of the retrieval at the step S2, the selection is preferably performed on the basis of the relational degree in the plurality of music composition (title) information, which are related to one geographic name. That is, when only the play list satisfying the necessary time length is made, the plurality of music compositions (titles) corresponding to the retrieved result may be randomly used to make the play list. However, the music composition having the high relational degree is desired not to be removed from the play list, if possible. Such a relational degree may be based, for example, on the information indicative of the relational degree added to the related geographical names #1, #2, . . . contained in each attribute information, in the music composition database 100 or 100' shown in FIG. 2. Or, it may be based on the data order, under the premise that the order of the related geographical names #1, #2, . . . is determined so as to correspond to the order of the relational degree.

Moreover, the first embodiment may be designed such that the agent for automatically making the play list not only selects the plurality of music compositions (titles) but also determines the selection order of the respective selected music compositions (titles), for example, in accordance with the relational degree. Furthermore, it may be designed such that as the music composition has the higher relational degree to the destination, this music composition is outputted at the location closer to the destination. Such a design enables the music composition having the higher relation to the destination to be reproduced as the self-car approaches the destination.

(Second Embodiment)

Figure 4:
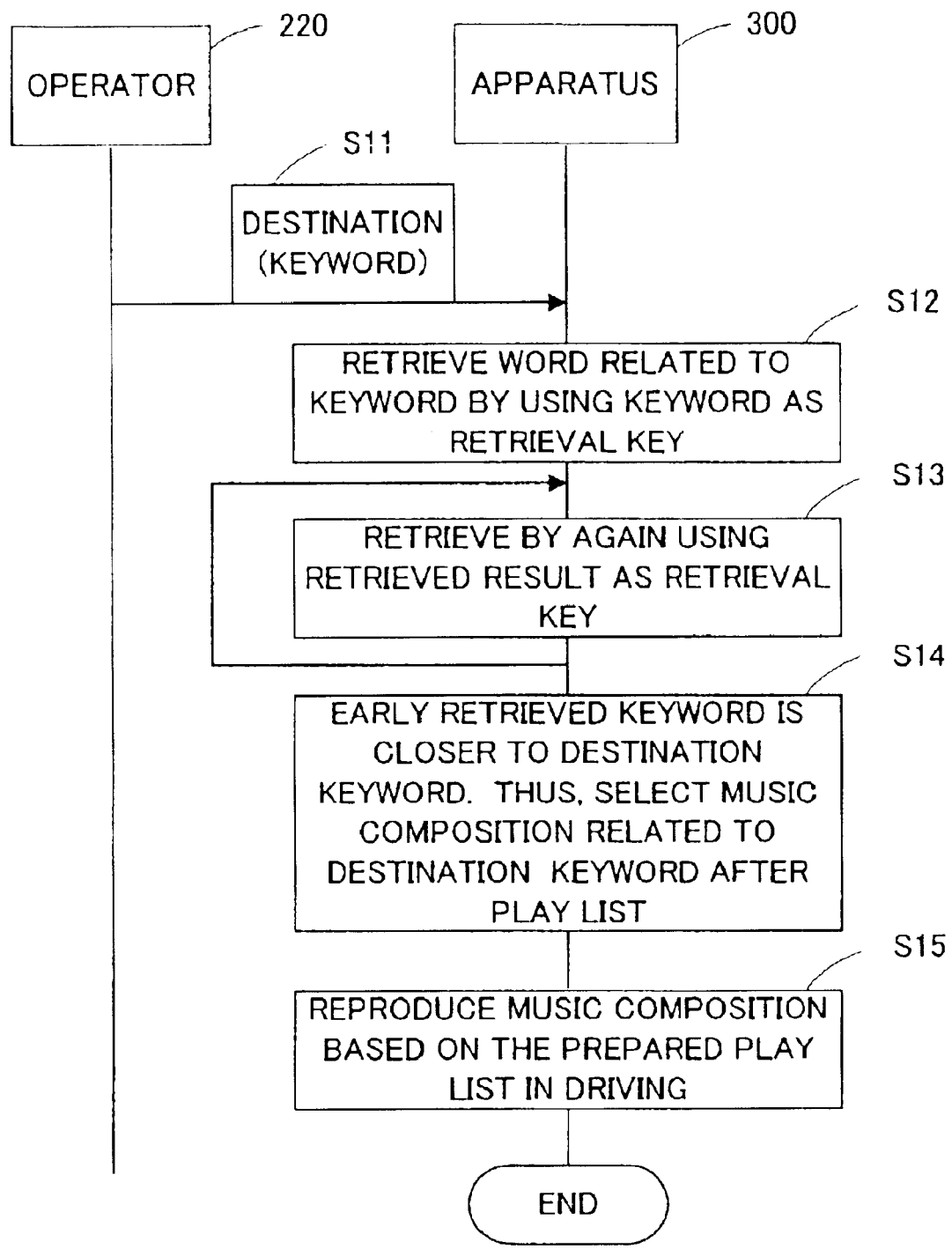
FIG. 4 is a sequence chart showing operations in a second embodiment of the present invention.
Figure 5:
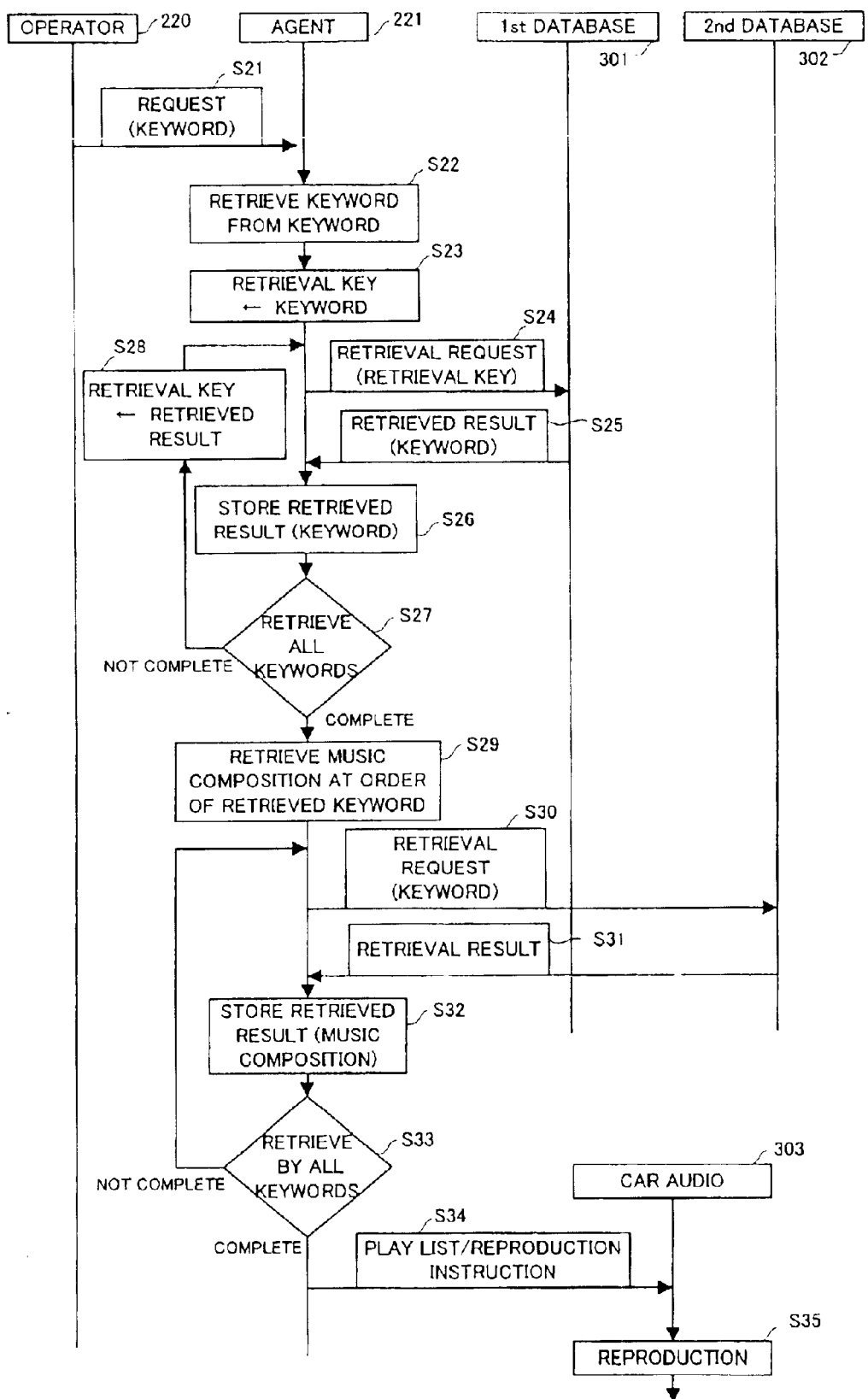
FIG. 5 is a sequence chart temporally showing the operations of the second embodiment of the present invention, with regard to an agent, a first database and a second database.
Figure 6:
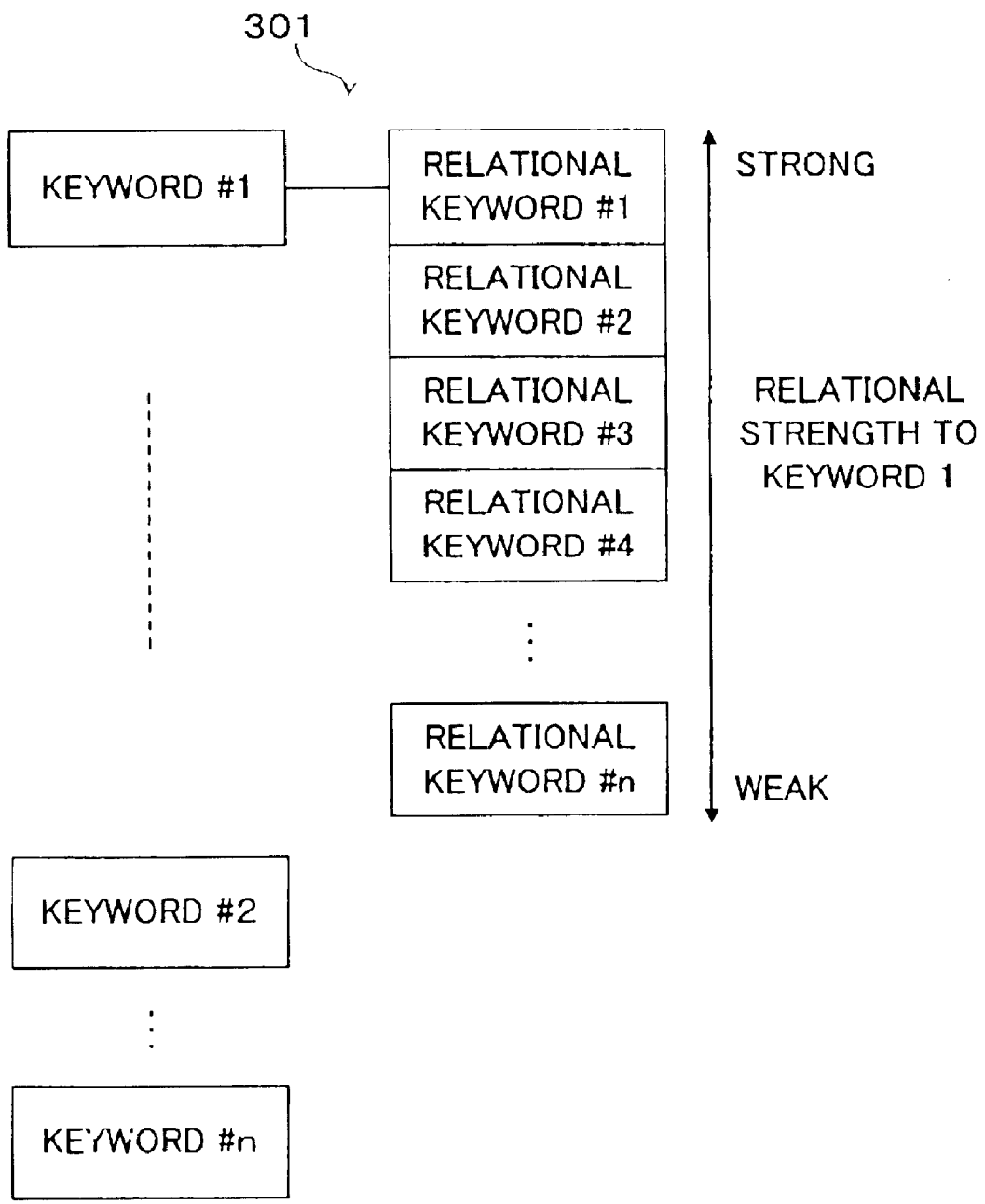
FIG. 6 is a conceptual view showing a structure of the first database in the second embodiment.
Figure 7:
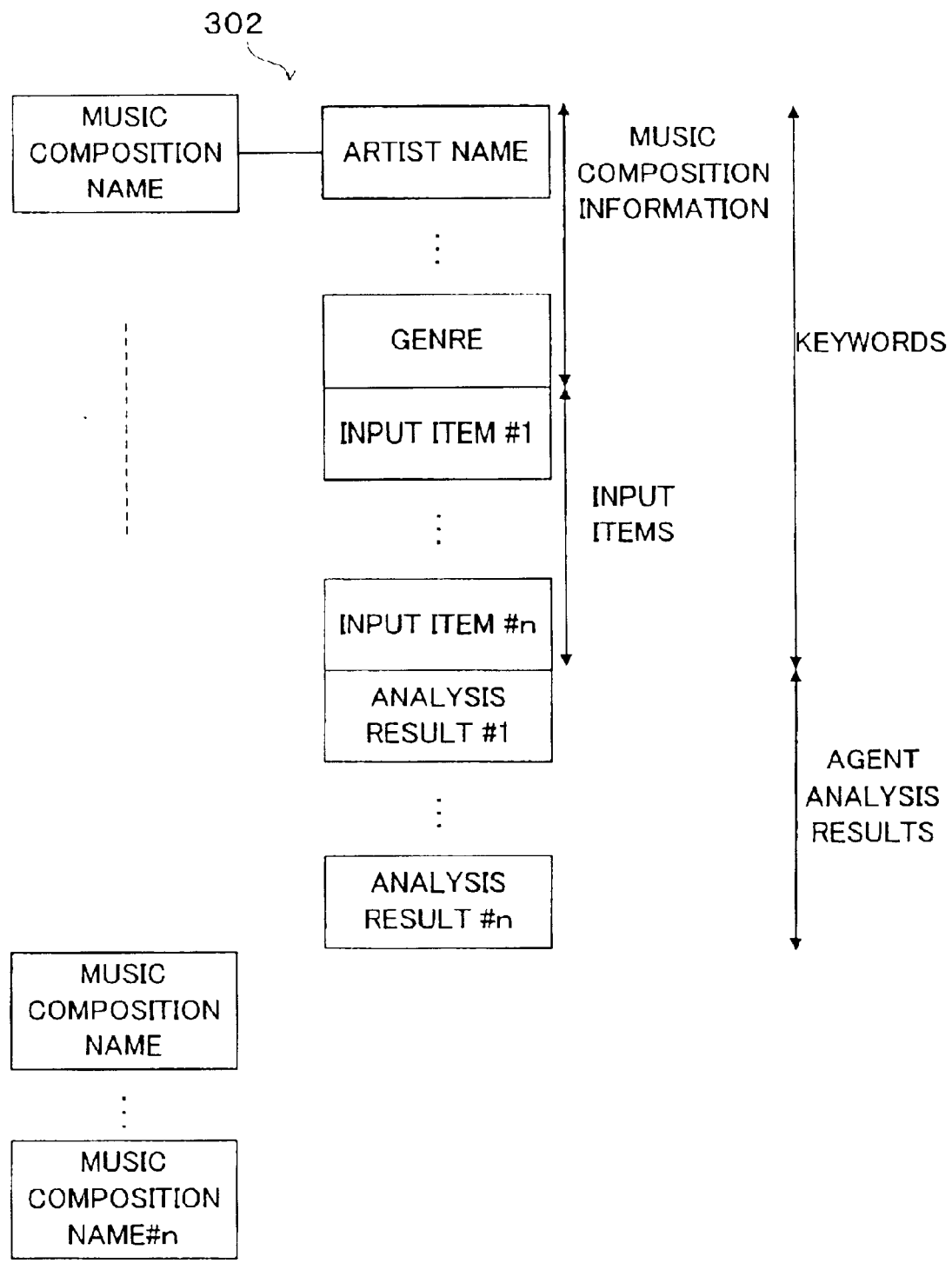
FIG. 7 is a conceptual view showing a structure of the second database in the second embodiment.

A second embodiment of the present invention will be described below with reference to FIG. 4 to FIG. 7. Here, FIG. 4 is a sequence chart showing the operations in the second embodiment, and FIG. 5 is a sequence chart temporally showing the operations on the apparatus side in the second embodiment shown in FIG. 4, with regard to the agent, the first database, the second database and the car audio system. FIG. 6 is a conceptual view showing the configuration of the first database for retrieving a relational keyword, and FIG. 7 is a conceptual view showing the configuration of the second database for retrieving the music composition. By the way, the hardware configuration in the second embodiment is similar to that of the first embodiment shown in FIG. 1.

In the second embodiment, an agent 221 for automatically making the play list appropriate for the destination is logically established within the CPU 22, as conceptually shown in FIG. 5, and a first database 301 is installed for retrieving a relational keyword related to the destination, and a second database 302 is installed fro retrieving the music composition related to the relational keyword. By the way, in FIG. 5, as for the processes carried out between four constitutional elements, the orientations of the arrows drawn between the longitudinal lines extending from these four constitutional elements indicate the orientations of the processes, and the process contents are indicated above the respective arrows. The process to be singly performed by any one of these four constitutional elements is indicated on the longitudinal line extending from these four constitutional elements. Moreover, in FIG. 4 and FIG. 5, the temporal flow of the process advances from the upward direction to the downward direction.

The second embodiment is designed such that the agent constituting the example of the selecting device uses the two databases to thereby select the music compositions and then make the play list. The other configurations are similar to those of the first embodiment.

In FIG. 4, at first, a person (operator) 220 inputs a destination through the input device 60, as one of the input operations on the navigation system (Step S11). This input is performed by using the key input, the selective input through the button on the screen, the voice input or the like. For example, "KUJUKURIHAMA (KUJUKURI-beach)" is inputted as the destination.

On the side of an apparatus 300, which has received it, the agent for automatically making the play list, which is established within the CPU 22, retrieves the relational keyword, with the inputted destination as a retrieval keyword.

In succession, the retrieval is repeated by again using the retrieved relational keyword, which is the retrieved result, as the retrieval keyword (Step S13). The repetition of the retrieval is continued until a new relational keyword is not retrieved even if the retrieval is repeated.

Next, since the earlier retrieved relational keyword is closer to the destination implying the original relational keyword, the music composition related to the relational keyword, which is directly related to this destination keyword, is selected on a rear side from the play list (i.e., at an order at which it is outputted immediately before the arrival at the destination) (Step S14). On the other hand, since the later retrieved relational keyword is located farther from the destination implying the original relational keyword, the music composition, which is indirectly related to this destination keyword, is select on a front side from the play list (i.e., at an order at which it is outputted immediately after the start from a current position). As those results, the music composition list or the play list is automatically made by the agent for automatically making the play list, which is established within the CPU 22.

Next, the car audio system sequentially reproduces the music compositions, in accordance with the thus-prepared play list (Step S15). Thus, the music compositions related to the destination are sequentially reproduced during the traveling of the self-car. Moreover, as the self-car approaches the destination the closer, the music compositions having the higher relational degree to the destination is reproduced.

The retrieval of the database at the steps S12 to S14 and the preparation of the play list will be described below in detail with reference to FIG. 5 to FIG. 7.

In FIG. 5, at first, the person (operator) 220 inputs a keyword indicative of a destination through the input device 60, as one of the input operations on the navigation system or one of the automatically preparing operations of the play list done by the agent 221 independently of the navigation operation (Step S21). This input is done by using the key input, the selective input through the button on the screen, the voice input and the like. Here, for example, "KUJUKURIHAMA (KUJUKURI-beach)" (a peculiar geographic name) as the keyword indicative of the destination, "SEA" (an abstractive geographic name), "Sea Bathing" (a general keyword related to a geographic name) and the like are inputted.

The agent 221, which has received it, starts the process of retrieving the relational keyword from the keyword inputted at the step S21 (Step S22). Thus, at first, the keyword inputted at the step S21 is set for the retrieval keyword (Step S23). Then, the retrieval request is performed on the first database 301, and the relational keyword is retrieved (Step S24). In response to it, the retrieved result is returned from the first database 301 to the agent 221 (Step S25). Here, for example, with regard to "KUJUKURIHAMA (KUJUKURI-beach)", "Sea Bathing" and the like implying the retrieval keyword whose retrieval is requested at the step S24, the relational keywords such as "Boat", "Wave", "Seaside", "Port", "Chiba (Chiba-prefecture)" and the like are returned from the first database 301 at the step S25.

Here, as shown in FIG. 6, the first database 301 has such a structure that keywords are made into a database. This structure has one or a plurality of keywords in relation to one keyword. Moreover, there are a plurality of such structures. Actually, in FIG. 6, the relational keywords 1#, #2, . . . and #n are registered in correlation with each of the input keywords #1, #2, . . . and #n. This registration order implies the order starting with the strongest relation strength to each inputted keyword.

Again in FIG. 5, the agent 221, which has received this retrieved result, stores the retrieved relational keyword implying the retrieved result (Step S26).

In succession, the agent 221 checks whether or not all the keyword retrievals in the first database 301 are completed (Step S27). If they are not completed, then, the retrieved result obtained at the step S25 is set for the retrieval keyword (Step S28). Then, the processes at the steps S24 to S27 are repeated.

At the step S27, if all the keyword retrievals in the first database 301 are completed, the operational flow branches into a step S29.

In succession, at the steps S24 and S25, the process of retrieving the second database is started at the order of the retrieved relational keyword (Step S29). Thus, at first, at the step S30, the retrieval request is performed on the second database 302. Then, the retrieval of a title or an identification number of the music composition corresponding to the relational keyword is carried out (Step S30). In response to it, the retrieved result is returned from the second database 302 to the agent 221 (Step S31). Here, for example, the music compositions corresponding to the relational keywords, such as "Boat", "Wave", "Seaside", "Port", "Chiba" and the like, which are the relational keywords stored at the step S26 are returned from the second database 302 at the step S31.

Here, as shown in FIG. 7, the second database 302 is composed of, for example, the, music composition information (e.g., a music composition name or song name (title), an artist name, a genre and the like) and the relational keyword. The keyword (e.g., the music composition information and the input item) and an agent analysis result are registered in the second database 302, for each music composition. The music composition information and the input items are registered in the keywords. For example, such music composition information is downloaded through the Internet. Then, the keywords that can be freely registered by the person are registered in the input items. On the contrary, when the music compositions are registered onto the hard disc, the music compositions are analyzed by the agent, that result is registered in the agent analysis result. Thus, it is possible to retrieve the music composition related to (corresponding to or partially corresponding to) the retrieval keyword. Hence, a plurality of music compositions related to "KUJUKURIHAMA (KUJUKURI-beach)" are retrieved with regard to one input keyword, for example, such as "KUJUKURIHAMA (KUJUKURI-beach)" or the like.

Again in FIG. 5, the agent 221, which has received the retrieved result, stores the retrieved music composition (title) or the identification number of the music composition implying the retrieved result (Step S32).

In succession, the agent 221 checks whether or not the music composition retrievals in the second database 302 using all the relational keywords are completed (Step S33). If they are not completed, the processes at the steps S30 to S33 are repeated.

If the music composition retrievals in the second database 302 using all the relational keywords are completed at the step S33, the reproduction instruction together with the play list stored as the retrieved result (at the step S32) by the agent 221 is instructed to the car audio system 303 (Step S34).

At this time, because the earlier retrieved relational keyword is the closer to the inputted keyword (i.e., the inputted destination) implying the original retrieval keyword, the retrieved result stored at the step S32 becomes the play-list in which a plurality of music compositions are arranged in the order starting with the deepest relation degree. That is, the agent 221 may send the retrieved result stored at the step S32 to the car audio system 223, in the form of the play list. Here, it is desirable to select the music composition related to the relational keyword having the deeper relation to the inputted keyword, on the rear side from the play list (i.e., at the order at which it is outputted immediately before the arrival at the destination).

The car audio system 303, which has received it, sequentially reproduces the music compositions, in accordance with the play list prepared by the agent 221 (Step S35). Thus, the music compositions related to the inputted keyword (i.e., the inputted destination) are sequentially reproduced during the traveling of the self-car. Moreover, as the self-car approaches the destination the closer, the music composition having the higher relational degree to the destination is reproduced As mentioned above, according to the second embodiment, the usage of the two databases enables the music composition or compositions corresponding to the inputted keyword or destination to be selected relatively simply and quickly. Thus, it is possible to attain the audio output and/or the video output appropriate for the traveling state of the self-car.

In the second embodiment especially, the agent 221 retrieves the relational keyword, which is the retrieved result, as the new retrieval keyword at the steps S23 to S27. Thus, the retrieval can be done in the range between the relational keyword directly related to the inputted keyword and the relational keyword indirectly related thereto. So, even if the necessary time length until the arrival at the destination is long, it is possible to reduce the possibility of the shortage in the music compositions to be reproduced. Also, the retrieved order indicates the relational degree as it is. Hence, the work for determining the order in the play list in accordance with the relational degree is very simple, which is very advantageous in a technical point. However, if a considerable number of relational keywords are retrieved for the inputted keyword at the step S25, the further retrieval from the first database 301 may be omitted in which such a retrieved result is used as the retrieval keyword.

By the way, the keyword inputted at the step S21 may be a peculiarly geographic name indicative of a destination (for example, "KUJUKURIHAMA (KUJUKURI-beach)", "YOKOHAMA" or the like) or an abstractly geographic name (for example, "Sea", "Beach" or "Seaside"). It may be an abstract name having a little relation to a geographic name, such as "Ski", "Camp", "Movie", "Ship", "Wedding Ceremony" or the like.

(Modified Embodiments)

The above-mentioned respective embodiments describe the example in which the content information is composed of the audio information, for the convenience of the explanation. However, the present invention can be similarly applied, as long as the content information has some relationship with the location directly or indirectly, even if the content information is the video information or the combination of the audio information and the video information and even if it is further text information (or video information made into a text) and the like.

For example, if the on-vehicle electronic system of the present invention is applied to a case in which the video information is given to a fellow passenger at a back seat or an assistant seat, it is possible to prepare a video list corresponding to the expected necessary time length. More concretely, in a case of a movie, a movie that is stored in a DVD list or a hard disc and can be viewed within the necessary time length is automatically selected similarly to the first or second embodiment. In this case, if the self-car arrives at the destination earlier than the schedule, it may be designed such that the movie is completed in time to the arrival time point by carrying out a double speed reproduction or a partially removed reproduction.

Moreover, if the on-vehicle electronic system of the present invention is applied to such a case that the text information of a book (i.e., the electronic book), a comic and the like is provided, a book appropriate for the destination or the like is automatically selected.

Moreover, in the respective embodiments, the music composition list is prepared in accordance with the destination inputted to the navigation system and the necessary time length until the arrival at the destination calculated by the navigation system. In addition, the function serving as the monitoring device for monitoring whether or not the movement of the self-car is on the schedule may be given to the navigation system, and, if the progress of the self-car is not on the schedule based on the monitored result, the agent for automatically making the music composition list may apply a change onto the previously once made music composition list. Actually, if the progress of the self-car is behind the schedule, it adds a music composition or compositions to the current music composition list. If the progress of the self-car is ahead of the schedule, it carries out the removal of a music composition or compositions from the music composition list and the like. Thus, even if a deviation occurs in the necessary time length, the music composition having the highest relational degree to the destination is outputted at the location closer to the destination, as mentioned above.

The respective embodiments execute the process of selecting the content information within the on-vehicle electronic system. However, such a process can be also executed by using the communication device 38 within the on-vehicle electronic system and then communicating with a server on the Internet or the like. In this case, the agent virtually established within the on-vehicle electronic system in the above explanation (actually attained by the CPU 22 and its program) can be established on the server on the Internet and used as the server having the function of selecting the content information or the function of preparing the music composition list. The input information with regard to the destination indicated by the driver or the like, the favorite artist and genre, the music composition to be outputted at the time of the special situation and the like is sent through the communication device 38 to the server, and the server sends the corresponding music composition list and the like to the on-vehicle electronic system. Then, in the on-vehicle electronic system, the content information is outputted in accordance with this received music composition list and the like. In addition, even the navigation function with regard to a route research, a route guide and the like after the input of the destination can be executed while the communication device 38 is used to communicate with the server.

The electronic system for the movable body of the present invention can be applied not only to the on-vehicle electronic system of the respective embodiments but also to a navigation apparatus for a walker, which uses a portable information terminal, a portable telephone or the like. This case is allowable if the portable information terminal, the portable telephone and the like have the content reproducing function such as the music reproducing function and the like.

As detailed above, according to the present invention, in the electronic system for the movable body which includes the information outputting apparatus for the movable body and the navigation apparatus for the movable body, such as the car audio system and the like, it is possible to output the audio information and/or the video information corresponding to the movement state of the movable body.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-175613 filed on Jun. 11, 2001 including the specification, claims, drawings and summary is incorporated herein by reference in its entirety.

What is claimed is:

1. A controlling apparatus for controlling an electronic system for a movable body, said electronic system comprising: an information outputting apparatus having an output device which outputs a content information including at least one of an audio information and a video information; and a navigation apparatus, which is equipped with an input device through which a destination in a movement of a movable body can be inputted and which carries out a navigation operation with regard to the destination inputted by the input device, said controlling apparatus comprising:
a selecting device which selects the content information, which is for a purpose of an audio and/or visual entertainment operation other than the navigation operation, to be outputted during the movement of said movable body until an arrival at the destination, on the basis of the destination inputted by said input device; and
an output controlling device which controls said output device so as to output the content information selected by said selecting device, during the movement of the movable body until the arrival at the destination,
wherein, in the navigation operation, said output device outputs at least one of another audio information and another video information, which are different from the content information and which are for a purpose of the navigation operation, and
said selecting device selects one or a plurality of content information related to the inputted destination, by retrieving a database, which correlates a preset geographical name with the one or plurality of content information, by using the inputted destination as a keyword, on the basis of a degree to which the plurality of content information is related to at least one geographical name, whereby the selecting device can discriminate between content information directly related to the inputted destination and content information indirectly related to the inputted destination.

2. A controlling apparatus according to claim 1, wherein said selecting device determines an output order of the plurality of content information to be outputted at said output device in case of selecting the plurality of content information, and said output controlling device controls said output device so as to output the plurality of content information in the output order determined by said selecting device.

3. A controlling apparatus according to claim 2, wherein said selecting device determines the output order on the basis of a relational degree on the plurality of content information related to at least one geographical name.

4. A controlling apparatus according to claim 2, wherein said selecting device determines the output order such that the content information having a higher relational degree to the destination among the plurality of content information is outputted in vicinity of the destination.

5. A controlling apparatus according to claim 1, wherein said selecting device selects one or a plurality of relational keywords related to the inputted destination by retrieving a first database, which correlates a preset geographical name with the one or plurality of relational keywords, by using the inputted destination as a keyword, and selects the one or plurality of content information related to the selected relational keyword or keywords by retrieving a second database, which correlates a preset relational keyword with the one or plurality of content information, by using the selected relational keyword or keywords as a keyword.

6. A controlling apparatus according to claim 5, wherein said selecting device selects the relational keyword or keywords on the basis of a relational degree on the plurality of relational keywords related to at least one geographical name.

7. A controlling apparatus according to claim 5, wherein said selecting device selects the content information on the basis of a relational degree on the plurality of content information related to at least one relational keyword.

8. A controlling apparatus according to claim 5, wherein said selecting device determines an output order of the content information to be outputted at said output device in case of selecting the plurality of content information, and said output controlling device controls said output device so as to output the plurality of content information in the output order determined by said selecting device.

9. A controlling apparatus according to claim 8, wherein said selecting device determines the output order on the basis of a relational degree on a plurality of relational keywords related to at least one geographical name.

10. A controlling apparatus according to claim 8, wherein said selecting device determines the output order on the basis of a relational degree on the plurality of content information related to at least one relational keyword.

11. A controlling apparatus according to claim 8, wherein said selecting device determines the output order such that the content information having a higher relational degree to the destination among the plurality of content information is outputted in vicinity of the destination.

12. A controlling apparatus according to claim 5, wherein, after selecting one relational keyword, said selecting device further selects one or a plurality of different relational keywords related to the one selected relational keyword, by retrieving said first database by using the one selected relational keyword as a keyword.

13. A controlling apparatus according to claim 1, wherein said navigation apparatus further comprises a calculating device which calculates a necessary time length required for said movable body to arrive at the destination inputted by said input device from a current position of said movable body, and said selecting device selects the content information in accordance with the calculated necessary time length in addition to the destination.

14. A controlling apparatus according to claim 13, wherein said navigation apparatus further comprises a monitoring device which monitors whether or not the movement of said movable body is on schedule, and said selecting device applies a change onto the content information to be outputted after a current time point if the movement of said movable body is not on schedule according to a monitor result of said monitoring device.

15. The controlling apparatus according to claim 1, wherein said selecting device generates a play list, which is composed of a plurality of songs and which indicates a combination of a plurality of pieces of content information depending on the inputted destination.

16. A program storage device readable by a computer for tangibly embodying a program of instructions executable by the computer to perform method processes in an electronic system for a movable body, said electronic system comprising an information outputting apparatus having an output device which outputs a content information including at least one of an audio information and a video information; and a navigation apparatus, which is equipped with an input device through which a destination in a movement of a movable body can be inputted and which carries out a navigation operation with regard to the destination inputted by the input device, said method processes comprising:

a selecting process of selecting the content information, which is for a purpose of an audio and/or visual entertainment operation other than the navigation operation, to be outputted during the movement of said movable body until an arrival at the destination, on the basis of the destination inputted by said input device; and an output controlling process of controlling said output device so as to output the content information selected by said selecting process, during the movement of the movable body until the arrival at the destination, wherein, in the navigation operation, said output device outputs at least one of another audio information and another video information, which are different from the content information and which are for a purpose of the navigation operation, and said selecting process is for selecting one or a plurality of content information related to the inputted destination, by retrieving a database, which correlates a preset geographical name with the one or plurality of content information, by using the inputted destination as a keyword, on the basis of a degree to which the plurality of content information is related to at least one geographical name, whereby the selecting process can discriminate between content information directly related to the inputted destination and content information indirectly related to the inputted destination.

17. A computer data signal embodied in a carrier wave and representing a series of instructions which cause a computer to perform method processes in an electronic system for a movable body, said electronic system comprising an information outputting apparatus having an output device which outputs a content information including at least one of an audio information and a video information; and a navigation apparatus, which is equipped with an input device through which a destination in a movement of a movable body can be inputted and which carries out a navigation operation with regard to the destination inputted by the input device, said method processes comprising:

a selecting process of selecting the content information, which is for a purpose of an audio and/or visual entertainment operation other than the navigation operation, to be outputted during the movement of said movable body until an arrival at the destination, on the basis of the destination inputted by said input device; and an output controlling process of controlling said output device so as to output the content information selected by said selecting process, during the movement of the movable body until the arrival at the destination, wherein, in the navigation operation, said output device outputs at least one of another audio information and another video information, which are different from the content information and which are for a purpose of the navigation operation, and said selecting process is for selecting one or a plurality of content information related to the inputted destination, by retrieving a database, which correlates a preset geographical name with the one or plurality of content information, by using the inputted destination as a keyword, on the basis of a degree to which the plurality of content information is related to at least one geographical name, whereby the selecting process can discriminate between content information directly related to the inputted destination and content information indirectly related to the inputted destination.

18. An electronic system for a movable body comprising:

an information outputting apparatus having an output device which outputs a content information including at least one of an audio information and a video information;

a navigation apparatus, which is equipped with an input device through which a destination in a movement of a movable body can be inputted and which carries out a navigation operation with regard to the destination inputted by the input device;

a selecting device which selects the content information, which is for a purpose of an audio and/or visual entertainment operation other than the navigation operation, to be outputted during the movement of said movable body until an arrival at the destination, on the basis of the destination inputted by said input device; and an output controlling device which controls said output device so as to output the content information selected by said selecting device, during the movement of the movable body until the arrival at the destination, wherein, in the navigation operation, said output device outputs at least one of another audio information and another video information, which are different from the content information and which are for a purpose of the navigation operation, and said selecting device selects one or a plurality of content information related to the inputted destination, by retrieving a database, which correlates a preset geographical name with the one or plurality of content information, by using the inputted destination as a keyword, on the basis of a degree to which the plurality of content information is related to at least one geographical name, whereby the selecting device can discriminate between content information directly related to the inputted destination and content information indirectly related to the inputted destination.

19. A controlling method of controlling an electronic system for a movable body, said electronic system comprising an information outputting apparatus having an output device which outputs a content information including at least one of an audio information and a video information; and a navigation apparatus, which is equipped with an input device through which a destination in a movement of a movable body can be inputted and which carries out a navigation operation with regard to the destination inputted by the input device, said controlling method comprising:

a selecting process of selecting the content information, which is for a purpose of an audio and/or visual entertainment operation other than the navigation operation, to be outputted during the movement of said movable body until an arrival at the destination, on the basis of the destination inputted by said input device; and an output controlling process of controlling said output device so as to output the content information selected by said selecting process, during the movement of the movable body until the arrival at the destination, wherein, in the navigation operation, said output device outputs at least one of another audio information and another video information, which are different from the content information and which are for a purpose of the navigation operation, and said selecting process is for selecting one or a plurality of content information related to the inputted destination, by retrieving a database, which correlates a preset geographical name with the one or plurality of content information, by using the inputted destination as a keyword, on the basis of a degree to which the plurality of content information is related to at least one geographical name, whereby the selecting process can discriminate between content information directly related to the inputted destination and content information indirectly related to the inputted destination.

20. The controlling method according to claim 19, wherein said selecting process includes generating a play list, which composed of a plurality of songs and which indicates a combination of a plurality of pieces of content information depending on the inputted destination.

* * * * *